(12) United States Patent
Miller et al.

(10) Patent No.: US 12,191,547 B2
(45) Date of Patent: Jan. 7, 2025

(54) FERRIC ION REDUCTION SYSTEM TO ENABLE ELECTROLYTE REBALANCE WITHIN AN IRON FLOW BATTERY

(71) Applicant: UOP LLC, Des Plaines, IL (US)

(72) Inventors: Stuart R. Miller, Arlington Heights, IL (US); Christopher D. DiGiulio, Elmhurst, IL (US); William T. Kender, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 220 days.

(21) Appl. No.: 17/820,272

(22) Filed: Aug. 17, 2022

(65) Prior Publication Data

US 2023/0097875 A1    Mar. 30, 2023

Related U.S. Application Data

(60) Provisional application No. 63/261,628, filed on Sep. 24, 2021.

(51) Int. Cl.
*H01M 8/18*   (2006.01)
*H01M 8/04313*   (2016.01)
(Continued)

(52) U.S. Cl.
CPC ....... *H01M 8/188* (2013.01); *H01M 8/04313* (2013.01); *H01M 50/46* (2021.01); *H01M 50/673* (2021.01)

(58) Field of Classification Search
CPC .... H01M 8/188; H01M 50/673; H01M 50/46; H01M 8/04313
See application file for complete search history.

(56) References Cited

U.S. PATENT DOCUMENTS

| | | |
|---|---|---|
| 2013/0084482 A1 | 4/2013 | Chang et al. |
| 2014/0363747 A1 | 12/2014 | Evans et al. |
| 2018/0316037 A1* | 11/2018 | Song ................. H01M 8/04932 |

FOREIGN PATENT DOCUMENTS

CN    107978775 A    5/2018

OTHER PUBLICATIONS

International Preliminary Report on Patentability from corresponding PCT Application No. PCT/US2022/076785, issued Mar. 26, 2024.

(Continued)

*Primary Examiner* — Milton I Cano
*Assistant Examiner* — Albert Michael Hilton (57) ABSTRACT

A flow battery system with a cathode cell including a first electrode, an anode cell includes a second electrode, and a membrane between the two cells. A first electrolyte tank includes a catholyte. A second electrolyte tank includes an anolyte. The system includes two rebalancing cells. A first rebalancing cell is in fluid communication between the cathode cell and the first electrolyte tank and is configured to reduce active species from the catholyte. The second rebalancing cell is in fluid communication with the first electrolyte tank and the second electrolyte tank such that the first electrolyte tank and the second electrolyte tank are in direct fluid communication. The second rebalancing cell is configured to reduce active species from the catholyte and the reduced catholyte may be combined directly with the anolyte. The second rebalancing cell may be a chemical reactor, a catalytic reactor, or an electrochemical reactor.

17 Claims, 3 Drawing Sheets

(51) Int. Cl.
*H01M 50/46* (2021.01)
*H01M 50/673* (2021.01)

(56) References Cited

OTHER PUBLICATIONS

Written Opinion from corresponding PCT Application No. PCT/US2022/076785, mailed on Jan. 18, 2023.
International Search Report from corresponding PCT Application No. PCT/US2022/076785, mailed on Jan. 18, 2023.
Noack, Jens et al., Studies on Fe/Fe redox flow batteries with recombination cell, Journal of the Electrochemical Society, Dec. 10, 2020, vol. 167, Article No. 160527, Internal pp. 1-8.
Selverston, S., et al., All-iron hybrid flow batteries with in-tank rebalancing, Journal of the Electrochemical Society, May 30, 2019, vol. 166, No. 10, pp. A1725-A1731.

* cited by examiner

FERRIC ION REDUCTION SYSTEM TO ENABLE ELECTROLYTE REBALANCE WITHIN AN IRON FLOW BATTERY

RELATED APPLICATIONS

This application claims priority to U.S. Patent Application Ser. No. 63/261,628 filed on Sep. 24, 2021, the entirety of which is incorporated herein by reference.

FIELD OF THE INVENTION

This invention relates generally to redox flow batteries and more specifically, to redox flow batteries with electrochemical balancing cells coupled between the electrolyte storage tanks that allow for direct mixing of electrolytes.

BACKGROUND OF THE INVENTION

Energy storage systems have played a key role in harvesting energy from various sources. These energy storage systems can be used to store energy and convert it for use in many different applications, such as building, transportation, utility, and industry. A variety of energy storage systems have been used commercially, and new systems are currently being developed. Energy storage systems can be categorized as electrochemical and battery, thermal, thermochemical, flywheel, compressed air, pumped hydropower, magnetic, biological, chemical, and hydrogen energy storage. The development of cost-effective and eco-friendly energy storage systems is needed to solve the energy crisis and to overcome the mismatch between generation and end use.

Renewable energy sources, such as wind and solar power, have transient characteristics because they depend on environmental conditions and therefore require associated energy storage. Battery Energy Storage Systems (BESSs) such as redox flow batteries (RFBs) have attracted significant attention for large-scale stationary applications such as grid scale electricity storage. RFBs are electrochemical energy storage systems that reversibly convert chemical energy directly to electricity and are typically composed of two external storage tanks filled with active materials comprising metal ions that may be in different valance states, two circulation pumps, and a flow cell with a separation membrane which is located between the anode and the cathode and is used to separate the anolyte and the catholyte, as well as to utilize the current circuit by allowing the transfer of balancing ions. The anolyte, catholyte, anode, and cathode are commonly referred to as the negative electrolyte, positive electrolyte, negative electrode and positive electrode, respectively.

Among all the redox flow batteries developed to date, the all-vanadium redox flow batteries (VRFB) have been the most extensively studied. VRFBs use the same the same active species (vanadium) in both half cells, as such preventing contamination of electrolytes from one half cell to the other half cell through crossover at the membrane. VRFBs, however, are inherently expensive due to the use of high-cost vanadium.

All-iron redox flow batteries (IFBs) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{3+}$ during discharge; the reaction is given by Equation 1. The anode side half-cell reaction involves the deposition and dissolution of iron in the form of a solid plate; the reaction is given by Equation 2. The overall reaction is shown in Equation 3.

Redox electrode: $2Fe^{2+} \leftrightarrow Fe^{3+}+2e^- +0.77V$     (1)

Plating electrode: $Fe^{2+}+2e^- \leftrightarrow Fe^0 -0.44V$     (2)

Total: $3Fe^{2+} \leftrightarrow Fe^0 +2Fe^{3+} 1.21V$     (3)

An all-iron RFB typically operates with an acidic electrolyte which produces hydrogen gas at the anode as a parasitic side reaction. This reaction removes protons from the negative electrolyte to form hydrogen gas, which has the net effect of creating an imbalance in the state of charge of the battery and leads to a continual increase in the pH of the electrolyte system. Eventually, if there is no remedy, either the imbalance in the state of charge of the battery or the increasing pH of the electrolyte will lead to cell failure.

During the normal operation of an RFB, small inefficiencies can create large problems over the lifetime of the battery. These problems can stem from a number of sources such as: cross-over of active species across the membrane, parasitic side reactions, or incomplete discharging of the battery. Even small inefficiencies can eventually result in a poorly performing battery in a product designed to last more than 20,000 cycles. Therefore, a process is needed which can correct these inefficiencies. One solution to these problems mixing the electrolytes together to rebalance and refresh the system. Typically this may involve completely mixing the electrolyte solutions (anolyte and catholyte). The electrolytes are then appropriately reapportioned to the initial volumes. This process often rectifies a number of issues in RFBs, including a volume differential driven by osmotic pressure, redistribution of active species and supporting electrolyte, and the modulation of pH on both sides. Once the anolyte and catholyte are mixed together, the resulting solution contains an average of the concentration of the components in the original anolyte and catholyte solutions.

Maintaining optimal operating conditions within a redox flow battery often requires engineering controls to manage the health of the battery and the relative health of the electrolyte. In all-iron redox flow batteries, system inefficiencies associated with battery cycling can result in the accumulation of ferric cations in the catholyte, which if left unmanaged can lead to reduced battery capacity.

The parasitic evolution of $H_2(g)$ has been a technical challenge associated with redox flow battery technologies for over 40 years. In 1979, Thaller reported the importance of a rebalance cell in iron-chromium RFBs to address the minor reaction (hydrogen evolution) at the chromium electrode. $H_2$ generated within all the cells was collected and directed to the hydrogen (anode) electrode of the rebalance cell and the cathode of the rebalance cell receives the $Fe^{2+}/Fe^{3+}$ flow from the rest of the system. The electrochemical reactions which occur in the rebalance cell are opposite to the undesirable reactions which occur in the redox cell and self-regulating (limited by the total $H_2$ availability). The open circuit voltage of a $H_2/Fe^{3+}$ rebalance cell is about 0.7V so energy is produced rather than consumed in the rebalance process, demonstrating the electrochemical recombination of $H_2$. In 2005, Noah reported the used of the same rebalancing principle to improve the efficiency of the conventional copper electrowinning process which uses the water hydrolysis reaction as the anodic source of electrons. In order to improve energy efficiency an alternative anodic reaction of ferrous ion oxidation was proposed, and $H_2$ was used as an effective reductant of the ferric cation. Unlike the work of Thaller, where the ferric cations in the electrolyte and $H_2$ gas were passed next each other separated by a membrane in an electrochemical cell, Noah leveraged a trickle bed column reactor, demonstrating the catalytic reduction ferric cations, circulating a ferric ion electrolyte by pumping electrolyte solution to the top of the reactor from a reservoir. The electrolyte drained by gravity through the bed and into the reservoir directly below the reactor. $H_2$ was introduced to the bed through a small tube at the bottom and flowed upward through the bed and vented through an exit tube.

Current processes and systems employed for rebalancing the all-iron RFB cells are concerned with the reduction of $Fe^{3+}$ to $Fe^{2+}$ to control the state of charge of the catholyte. Different engineering approaches (electrochemical or catalytic) have demonstrated electrolyte rebalance within all-iron redox flow batteries, however the basic principle of ferric ion reduction remains largely unchanged from that taught by Thaller and Noah, where $H_2(g)$ is oxidized to protons ($H^+$) and the $Fe^{3+}$ in the catholyte is reduced to $Fe^{2+}$. When the reaction occurs, the state of charge is balanced, however the protons ($H^+$) migrate into the positive electrolyte. This essentially takes protons ($H^+$) from the negative electrolyte (during hydrogen generation) and releases them into the positive electrolyte (during rebalancing). A consequence of proton removal from the anolyte ($H_2$ evolution) and insertion into the catholyte ($H_2$ recombination) is the divergence of electrolyte pH from optimal operating values (the catholyte becomes more acidic and the anolyte becomes less acidic). Increasing pH of the anolyte can lead to the inability to completely oxidize plated iron to ferrous cations or the oxidation or loss of $Fe^0$ from the cell either as an iron oxyhydroxide, iron oxide or as iron flakes. This may result in reduced capacity in the anolyte. The direct introduction of $Fe^{3+}$ cations to the higher pH anolyte will lead to the precipitation of iron oxyhydroxide or iron oxide byproducts which can lead to battery obstruction and failure.

[$H^+$] management can be achieved to some extent through cycling the battery, whereupon [$H^+$] can cross the membrane upon cycling the battery. Another solution is employing a passive diffusion cell with a selective proton exchange membrane, where the electrolytes are passed adjacently to each other and protons diffuse from the catholyte to the anolyte across the PEM.

Another failure mechanism experienced by RFBs is electrolyte crossover (either hydraulic crossover or the crossover of active species or a combination of both) across the membrane which can be driven by the variation of concentration during charge and discharge, electrolyte flow rate, pressure and osmotic pressure differences. Electrolyte properties, such as density, viscosity and conductivity change with the oxidation state of the active species. In the case of a hybrid RFB, such as an all-iron RFB, significant disparity in the concentration of iron ions in the electrolytes can lead to a severe difference in osmotic pressure in the catholyte and anolyte, which in turn can lead to the migration of electrolyte across the membrane.

There are strategies to reduce electrolyte crossover—such as using different and varying flow rates for each electrolytes to compensate for any pressure differential across the membrane; or by enhancing the selectivity of the separator to eliminate the crossover of active species, something which is very challenging to achieve in practice. In the case of an all-iron RFB where the active species is the same in both electrolytes, the maximum system capacity can be restored by mixing and rebalancing the electrolyte so that each electrolyte tank has an equal number of active molecules.

SUMMARY OF THE INVENTION

An all-iron flow battery rebalancing system has been invented which allows for the direct transfer of catholyte to anolyte to balance the volume of electrolyte in the flow battery and the state of charge and pH of the electrolytes. This invention achieves this by providing a second rebalancing cell coupled directly between the electrolyte storage tanks to provide a reduced catholyte in which the $Fe^{3+}$ has been reduced to $Fe^{2+}$ to the anolyte. Since the reduced catholyte lacks the $Fe^{3+}$ of the catholyte, it may be combined directly with the anolyte without precipitating out $Fe(OH)_3$.

Accordingly, in an aspect the present invention may be broadly characterized as providing an iron redox flow battery system having: a redox electrode in fluid communication to a first electrolyte tank with a catholyte; a plating electrode in fluid communication to a second electrolyte tank with an anolyte; a rebalancing cell in fluid communication with the redox electrode and configured to reduce active species from the catholyte; and, a second rebalancing cell in fluid communication with the first electrolyte tank and the second electrolyte tank such that the first electrolyte tank and the second electrolyte tank are in direct fluid communication.

The second rebalancing cell may be a hydrogen recombination reactor. The hydrogen recombination reactor may be a chemical reactor, a catalytic reactor, or an electrochemical reactor.

The catholyte, the anolyte, or both may include iron ions and a source of the iron ions may be $FeCl_2$, $FeCl_3$, $FeSO_4$, $Fe_2(SO_4)_3$, FeO, Fe, $Fe_2O_3$, or combinations thereof.

The anolyte may include Fe' at a concentration between 1.0 to 4.5 M. The anolyte may further include one or more of NaCl, KCl, $NH_4Cl$, boric acid, glycine, $FeCl_3$ or combinations thereof.

The catholyte may include Fe' at a concentration between 0.5 to 4.0 M. The catholyte may further include one or more of NaCl, KCl, $NH_4Cl$, HCl, glycine, boric acid, $FeCl_3$ or combinations thereof.

The system may also include a monitoring device configured to provide an obtained value relating to a condition of the catholyte, or the anolyte, or both, and a controller in communication with the monitoring device. The controller may have non-transitory computer-readable media storing executable instructions that, when executed, cause the controller to: compare the obtained value against a threshold value, and, when the obtained value is above or below a threshold, displace a volume of the catholyte, via a pump, from the first electrolyte tank to the second rebalancing cell to reduce ferric cations in the catholyte. The system may further include a storage vessel in fluid communication between the second rebalancing cell and the second electrolyte tank. The executable instructions, when executed, may also cause the controller to compare an obtained value against a threshold value, and, when the obtained value is above or below a threshold, displace a volume of fluid, via a pump, from the storage vessel to the second electrolyte tank.

In one or more aspects, the present invention may also be broadly characterized as providing an iron redox flow battery system having: a cathode cell with a first electrode; an anode cell with a second electrode; a membrane separating the cathode cell and the anode cell; a first electrolyte tank with a catholyte, the first electrolyte tank in fluid communication with the cathode cell; a second electrolyte tank with an anolyte, the second electrolyte tank in fluid communication with the anode cell; a first rebalancing cell in fluid communication between the cathode cell and the first electrolyte tank, the first rebalancing cell configured to reduce active species from the catholyte; and, a second rebalancing cell in fluid communication with the first electrolyte tank and the second electrolyte tank such that the first electrolyte tank and the second electrolyte tank are in direct fluid communication. The second rebalancing cell is configured to reduce active species from the catholyte.

The second rebalancing cell may include at least two chambers. A first chamber of the at least two chambers may be configured to receive a portion of the catholyte and provide a reduced catholyte to the second electrolyte tank and a second chamber may be configured to receive a second portion of the catholyte. The reduced catholyte stream may include $H^+$ ions. Alternatively, an effluent stream from the second chamber may include $H^+$ ions. The second rebalancing cell may include a third chamber configured to oxidize hydrogen gas. The third chamber may be in electrical communication with the first chamber, and the second chamber may be located between the first chamber and the third chambers.

In one or more aspects, the present invention may also be broadly characterized as providing a process for balancing a pH, a state of charge, or a supporting electrolyte concentration of an electrolyte for an iron redox flow battery, the iron redox flow battery having a cathode cell with a first electrode and a catholyte and an anode cell with a second electrode and an anolyte. The process includes: passing a portion of the catholyte to a rebalancing cell; reducing a ferrous ions from the catholyte to provide a reduced catholyte; and, combining the reduced catholyte with the anolyte upstream of the anode cell.

The process may further include storing the reduced catholyte in a storage vessel before combining the reduced catholyte with the anolyte upstream.

The process may further includes monitoring a condition of the catholyte, the anolyte, or both by obtaining one or more values relating to the condition of the catholyte, the anolyte, or both, comparing the one or more obtained values against a threshold value, and, when the one or more obtained values is above or below the threshold value, pumping a volume of reduced catholyte from the storage vessel to combine with the anolyte.

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION

As mentioned above, a new all-iron flow battery rebalancing has been invented which includes a rebalancing cell for reversing the effects of electrolyte crossover in an all-iron flow battery. According to the present invention, an additional rebalancing cell is coupled directly between the electrolyte storage tanks in an all-iron flow battery system. Unlike previously described rebalancing solutions, implementation of the additional rebalancing cell enables control of the electrolyte tank volumes, pH and state of charge through direct transfer of electrolyte from the catholyte to the anolyte without precipitation of unwanted iron oxides or oxyhydroxides or the comproportionation reaction of the ferric cations with plated iron to produce ferrous cations.

Additionally, in at least one embodiment, the rebalancing cell provides for new processes for reversing the effects of electrolyte crossover.

With these general principles in mind, one or more embodiments of the present invention will be described with the understanding that the following description is not intended to be limiting.

Figure 1:
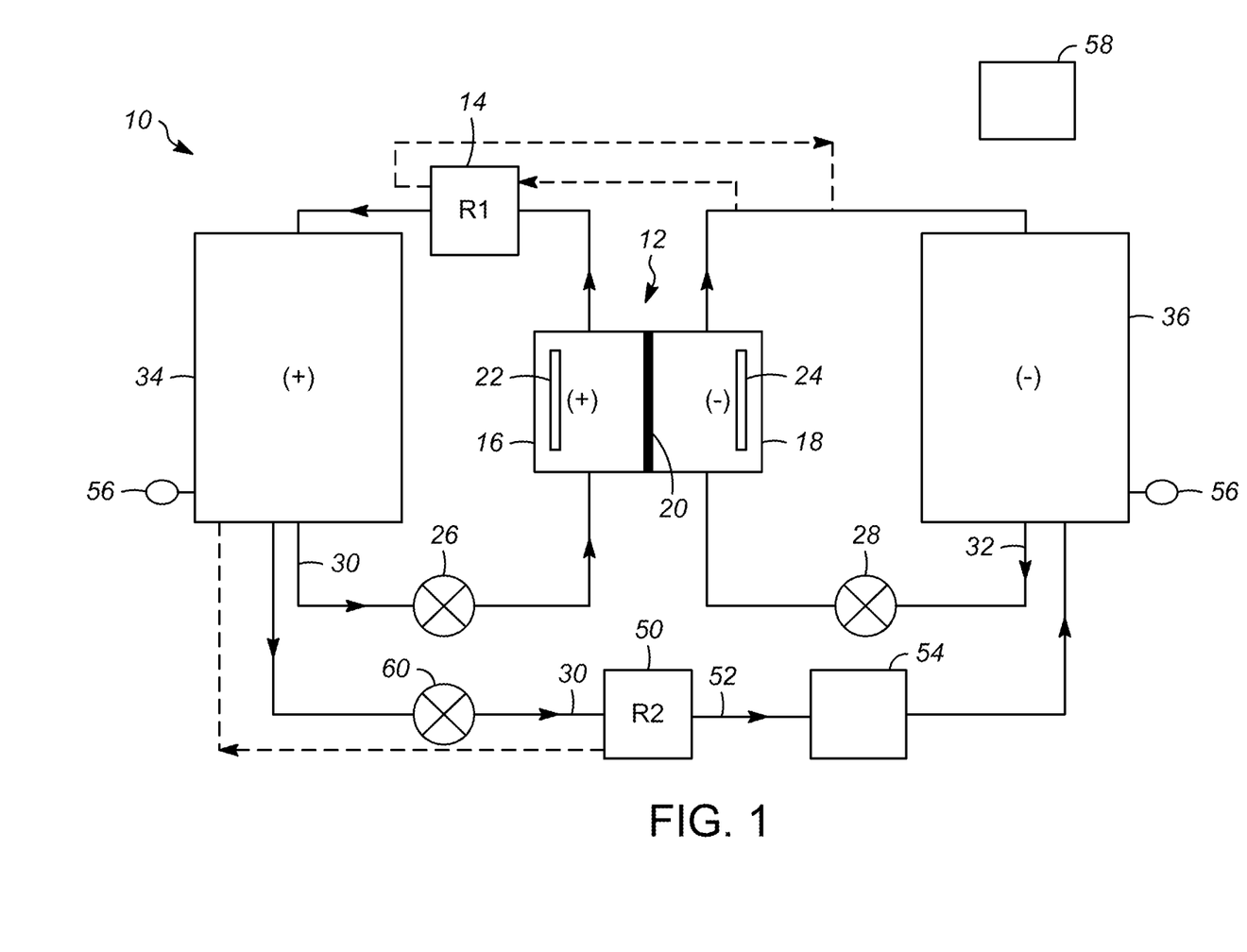
FIG. 1 is a schematic view of a redox flow battery with a balancing cell according to various aspects of the present invention.

As shown in FIG. 1, the present invention is directed at a battery system, and particular a flow battery system, and specifically an iron redox flow battery system 10. While the follow description is directed at the depicted iron flow battery system, this is intended to be exemplary and not limiting.

As is known, the iron redox flow battery system 10 includes a redox flow battery cell 12 and a rebalancing cell 14. The redox flow battery cell 12 includes two oppositely charged half cells, namely a cathode cell 16 and an anode cell 18 with a separator 20, or membrane, between the two half cells 16, 18. The separator 20 can be made from an ionic conducting material such as a microporous or ion-exchange membrane.

Each half cell 16, 18 includes an electrode 22, 24 that is formed from a suitably conductive material, such as a metal, carbon, graphite, and the like, and the materials for two can be the same or different. Accordingly, the cathode cell 16 includes a redox electrode 22 and the anode cell 18 includes a plating electrode 24. There may optionally be a non-conductive spacer between the electrode and the membrane. In the case of the anode, it may include only the conductive cell (not electrode) and a non-conductive spacer. This is referred to as "direct plating" of the iron onto the bipolar plate or cell.

The redox flow battery cell 12 typically further includes pumps 26, 28 which operate to circulate electrolytes 30, 32 from vessels such as tanks 34, 36, to one of the half cells 16, 18. In the depicted redox flow battery cell 12, the first electrolyte 30 is a catholyte and the second electrolyte 32 is an anolyte.

The catholyte 30 may have a pH of 2 or lower and include water, a first amino acid such as glycine, an inorganic acid such as HCl, an iron precursor such as $FeCl_2$ or a combination of $FeCl_2$ and $FeCl_3$, a supporting electrolyte such as $NH_4Cl$, NaCl, KCl or a mixture thereof and optionally a boric acid.

For example, the catholyte 30 may include $FeCl_2$ at a concentration of 1.0-4.5 M, $NH_4Cl$ at a concentration of 1.0-4.0 M, HCl at a concentration of 0.05-2.5 M, glycine at a concentration of 0.01-3.0 M, optionally boric acid at a concentration of 0.01-1.4 M, and optionally $FeCl_3$ at a concentration of 0.1-4.0 M. Alternatively, the catholyte 30 may include or may consist essentially of $FeCl_2$ at a concentration of 1.0-4.5 M, NaCl, KCl at a concentration of 1.0-3.0 M, HCl at a concentration of 0.05-2.5 M, glycine at a concentration of 0.01-3.0 M, optionally boric acid at a concentration of 0.01-1.4 M, and optionally $FeCl_3$ at a concentration of 0.1-4.0 M.

The anolyte 32 may have a pH greater than or equal to the pH of the catholyte 30. The anolyte 32 may include water, an iron precursor such as $FeCl_2$ or a combination of $FeCl_2$ and $FeCl_3$, a supporting electrolyte such as $NH_4Cl$ or NaCl, KCl, and a negative electrolyte additive such as boric acid or a mixture of boric acid and glycine.

For example, the anolyte 32 may include $FeCl_2$ at a concentration of 1.0-4.5 M, $NH_4Cl$ at a concentration of 1.0-4.0 M, optionally boric acid at a concentration of 0.01-1.4 M, optionally glycine at a concentration of 0.01-3.0 M. Alternatively, the anolyte 32 may include $FeCl_2$ at a concentration of 1.0-4.5 M, NaCl, KCl at a concentration of 1.0-3.0 M, optionally boric acid at a concentration of 0.01-1.4 M, optionally glycine at a concentration of 0.01-3.0 M.

In a known manner, the electrodes 22, 24 are in electrical communication through a circuit which causes reactions at the electrodes 22, 24. As would be appreciated, at the redox electrode 22 Equation 1, above, occurs. Additionally, at the plating electrode 24 Equation 2, above, occurs.

As discussed above, over the course of time, hydrogen gas is generated at the anode 24 and circulates within the anolyte 32. In addition to lowering the state of charge of the anolyte 32 (compared with the catholyte 30), the production of the hydrogen gas results in an increase pH of the anolyte 32. Further, flows of ions though the separator 20 offsets the charge balance between the anolyte 32 and the catholyte 30. To counteract the production of the hydrogen, the pH change and the state of change imbalance, the catholyte 30 and, in some configurations the anolyte 32, are passed to the rebalancing cell 14.

Figure 2:
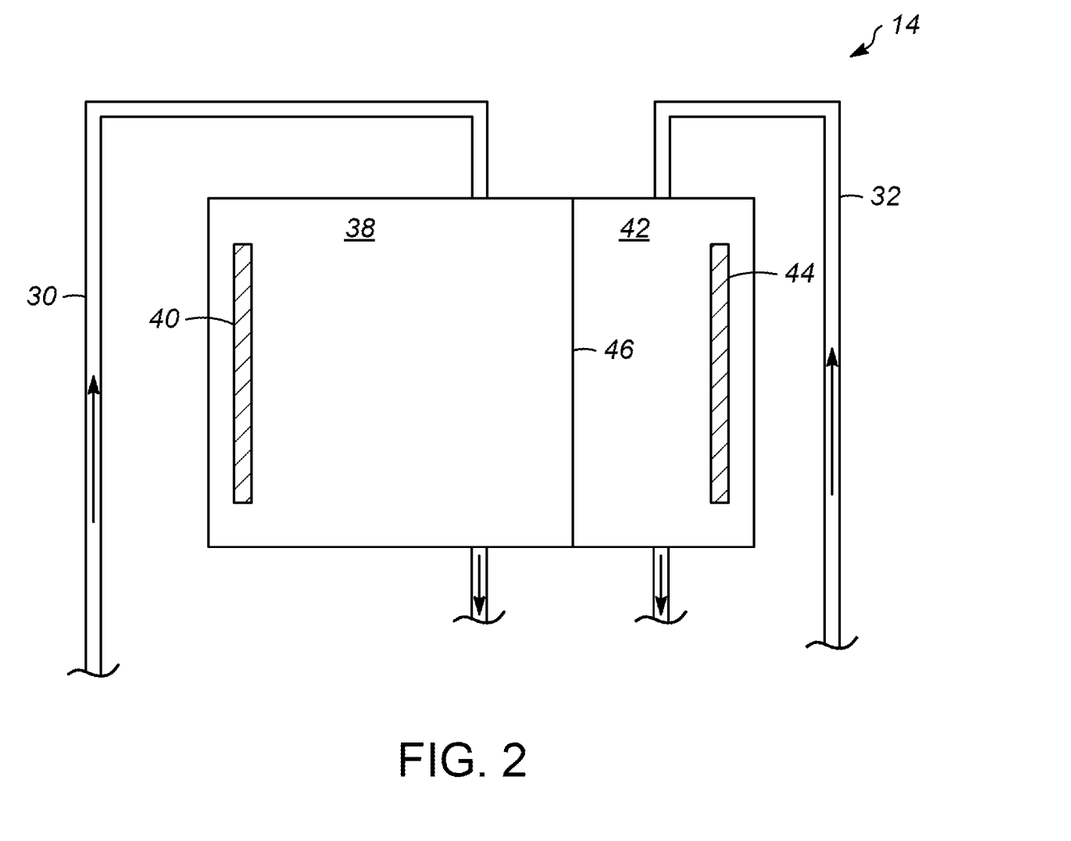
FIG. 2 is a schematic, view of a rebalancing cell that may be used according to the present invention; and, FIG. 3 is a schematic, exploded view of another rebalancing cell that may be used according to the present invention.

For example, as shown in FIG. 2, the rebalancing cell 14 may include a first chamber 38 which receives the catholyte 30 and hydrogen gas and which includes a catalyst coated substrate 40. The rebalancing cell 14 also includes a second chamber 42 which receives the anolyte 32 and which includes an electrode 44. A separator 46 forms an interface between the first and second chambers 38, 42. Based on a voltage applied, hydrogen in the anolyte 32 can be oxidized at the catalyst coated substrate 40.

While the rebalancing cell 14 is suitable to for reversing some of the hydrogen gas production, returning to FIG. 1, the catholyte 30 from the first chamber 38 is returned to the first tank 34 and the anolyte 32 from the second chamber 42 is returned to the second tank 36. Over time, the volume of the two electrolytes 30, 32 will become unbalanced and will require action before failure of the cell. Accordingly, the present invention provides a second rebalancing cell 50 located between the two tanks 34, 36. The second rebalancing cell 50 reduces the active species ($Fe^{3+}$) in a portion of the catholyte 30, allowing the reduced catholyte 52 to be transferred directly to or combined directly with the anolyte 32. This avoids the precipitation of $Fe(OH)_3$ that would otherwise occur by combining the two electrolytes. By transfer or combining directly, it is meant that the reduced catholyte 52 from the second rebalancing cell 50 is combined with the anolyte 32 outside of the flow battery cell 12.

The second rebalancing cell 50 may be a hydrogen recombination reactor and, in particular, may be a chemical reactor, a catalytic reactor, or an electrochemical reactor. For example, the second rebalancing cell 50 may have the configuration of the rebalancing cell 14 shown in FIG. 2. However, in contrast to the flow show in FIG. 2, for the second both chambers 38, 42 would receive catholyte 30.

Again, the reduced catholyte 30 produced at one of the chambers 38, 42 would be combined directly with the anolyte 32, while the catholyte 30 from the other chamber 38, 42 would be returned to the tank 34.

Additionally, shown in FIG. 1, it is further contemplated that a storage vessel 54 is located between the second rebalancing cell 52 and the anolyte tank 36. This storage vessel 54 could be used to store reduced catholyte 52 until it is needed.

For example, one or more monitoring devices, such as probes or sensors 56, are provided for obtaining a value, data, or information relating to a condition of the catholyte 30 and/or the anolyte 32. Exemplary conditions include pH of the electrolyte(s) 30, 32, an amount of hydrogen gas in the headspace of the anolyte tank 36, or, if the headspaces are connected, in the headspace of the catholyte tank 34, a redox state of the species of the electrolyte(s) 30, 32, or a turbidity of the electrolyte(s) 30, 32. Accordingly, for obtaining information on the pH of one of the electrolytes 30, 32, the sensors 56 may be or include a pH probe. Similarly, the sensors 56 may be or include a pressure sensor in the headspace of the anolyte tank 36 or catholyte tank 34 which may be used to determine the amount of hydrogen gas therein. Additionally, the sensors 56 may be or include an ORP probe configured to provide information on the redox state of the species of the electrolyte(s) 30, 32. Additionally, the sensors 56 may be or include a turbidity sensor configured to provide the amount of undissolved solids in the electrolyte(s) 30, 32.

A controller 58 may be in wired or wireless communication with the sensor 56 so that signals relating to a condition or value of the respective electrolyte 30,32 may be sent to the controller 58 for analysis or comparison against stored data. The controller 58 or a computing device may be any suitable devices configured to cause a series of steps to be performed so as to implement the various methods or steps such that instructions, when executed by the computing device or other programmable apparatus, may cause various functions/acts/steps described herein to be executed. The controller 58 or a computing device may be, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RANI), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by the controller 58 or computing device.

For example, the controller 58 may include non-transitory computer-readable media storing executable instructions that, when executed, may cause the controller 58 to compare an obtained value from the monitoring device against a threshold value which may be entered and stored, or may be determined by the controller 58 based on a variety of factors such as life of the cell, time since last rebalancing or other measured variables like ion concentration or volume. When the obtained value is above or below the threshold value, the controller 58 may send a signal to a pump 60 to transfer a volume of catholyte 30 from the first electrolyte tank 34 to the second rebalancing cell 50 to reduce ferric cations in the catholyte 30. The volume of catholyte 30 may be predetermined or may be determined in real time until a desired condition or value is reached.

Additionally, the controller 58 may include instructions that cause the controller 58 to compare a monitored value from the monitoring device 56 against a threshold value, and when the monitored value is above or below a threshold, a signal may be sent to the pump 60 so that a volume of reduced catholyte 52 is transferred from the storage vessel 54 to the anolyte tank 36.

The methods and steps described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 3:
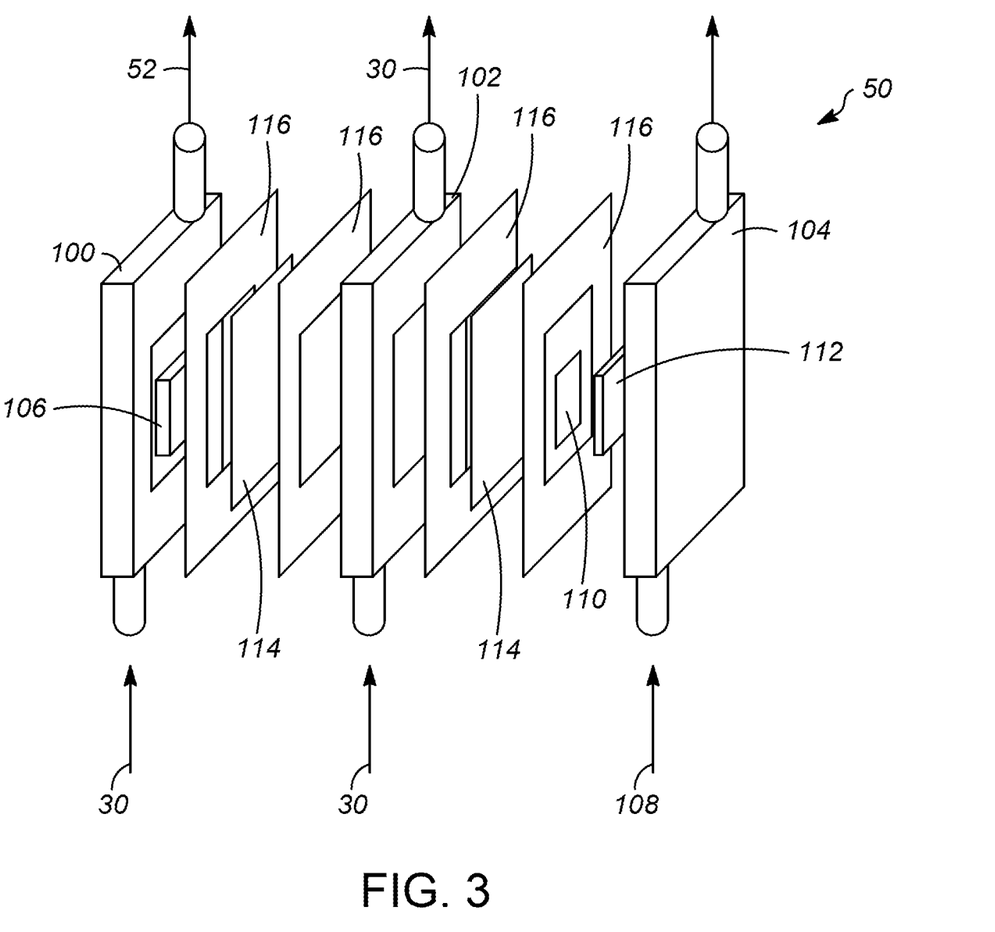

Turning to FIG. 3, another configuration for the second rebalancing cell 50 is shown which includes three chambers 100, 102, 104. The first chamber 100 is made from an electrically conductive material and contains a surface 106, such as carbon felt, configured for reducing $Fe^{3+}$ from the catholyte 30 to $Fe^{2+}$. Accordingly, the first chamber 100 receives a portion of the catholyte 30 and provides the reduced catholyte 52 which is combined with the anolyte 32 (FIG. 1).

The second chamber 102 is made of a non-conductive material such as a plastic. The second chamber 102 also receives the catholyte 30, however the effluent of the second chamber 102 is catholyte 30 and it may be returned to the catholyte tank 34.

The third chamber 104, like the first chamber 100, may also be constructed out of an electrically conductive material and is for oxidizing hydrogen gas ($H_2$) to provide $H^+$ ions. Accordingly, the third chamber may receive a stream of hydrogen gas 108 which may be from, for example a head space in the anolyte tank 36 (FIG. 1). To facilitate the reactions, the third chamber 104 may contain a gas diffusion layer 110 and a Pt/C catalyst or a membrane electrode assembly 112.

The chambers 100, 102, 104 are separated from each other by membranes 114 and separators 116. The separators 116 are made from non-conductive materials. The membranes 114 allows for fluid and ionic movement between the chambers 100, 102, 104.

The middle chamber 102 functions as a buffer region which accepts the $H^+$ formed during oxidation in the third chamber 104 while providing ionic conductivity between the anode 112 (in the third chamber 104) and surface 106 (in the first chamber 100). This configuration uses the same transfer mechanism to yield the benefits of the previous embodiment, but does so without the introduction of $H^+$ into the anolyte tank 36.

Specific Embodiments

While the following is described in conjunction with specific embodiments, it will be understood that this description is intended to illustrate and not limit the scope of the preceding description and the appended claims.

A first embodiment of the invention is an iron redox flow battery system comprising a redox electrode in fluid communication to a first electrolyte tank with a catholyte; a plating electrode in fluid communication to a second electrolyte tank with an anolyte; a rebalancing cell in fluid communication with the redox electrode and configured to reduce active species from the catholyte; and, a second rebalancing cell in fluid communication with the first electrolyte tank and the second electrolyte tank such that the first electrolyte tank and the second electrolyte tank are in direct fluid communication. An embodiment of the invention is one, any or all of prior embodiments in this paragraph up through the first embodiment in this paragraph, wherein the second rebalancing cell is a hydrogen recombination reactor. An embodiment of the invention is one, any or all of prior embodiments in this paragraph up through the first embodiment in this paragraph, wherein the hydrogen recombination reactor is a chemical reactor, a catalytic reactor, or an electrochemical reactor. An embodiment of the invention is one, any or all of prior embodiments in this paragraph up through the first embodiment in this paragraph, wherein the catholyte and the anolyte both comprise iron ions and wherein a source of the iron ions comprises $FeCl_2$, $FeCl_3$, $FeSO_4$, $Fe_2(SO_4)_3$, FeO, Fe, $Fe_2O_3$, or combinations thereof. An embodiment of the invention is one, any or all of prior embodiments in this paragraph up through the first embodiment in this paragraph, wherein the anolyte comprises $Fe^{2+}$ at a concentration between 1.0 to 4.5 M. An embodiment of the invention is one, any or all of prior embodiments in this paragraph up through the first embodiment in this paragraph, wherein the anolyte further comprises one or more of NaCl, KCl, $NH_4Cl$, boric acid, glycine, $FeCl_3$ or combinations thereof. An embodiment of the invention is one, any or all of prior embodiments in this paragraph up through the first embodiment in this paragraph, wherein the catholyte comprises $Fe^{2+}$ at a concentration between 0.5 to 4.0 M. An embodiment of the invention is one, any or all of prior embodiments in this paragraph up through the first embodiment in this paragraph, wherein the catholyte further comprises one or more of NaCl, KCl, $NH_4Cl$, HCl, glycine, boric acid, $FeCl_3$ or combinations thereof. An embodiment of the invention is one, any or all of prior embodiments in this paragraph up through the first embodiment in this paragraph, further comprising a monitoring device configured to provide an obtained value relating to a condition of the catholyte, or the anolyte, or both; a controller in communication with the monitoring device, the controller comprising non-transitory computer-readable media storing executable instructions that, when executed, cause the controller to compare the obtained value against a threshold value; and when the obtained value is above or below a threshold, displace a volume of the catholyte, via a pump, from the first electrolyte tank to the second rebalancing cell to reduce ferrous cations in the catholyte. An embodiment of the invention is one, any or all of prior embodiments in this paragraph up through the first embodiment in this paragraph, further comprising a storage vessel in fluid communication between the second rebalancing cell and the second electrolyte tank. An embodiment of the invention is one, any or all of prior embodiments in this paragraph up through the first embodiment in this paragraph, wherein the executable instructions, when executed, further cause the controller to compare an obtained value against a threshold value; and when the obtained value is above or below a threshold, pump a volume of fluid, via a pump, from the storage vessel to the second electrolyte tank.

A second embodiment of the invention is an iron redox flow battery system comprising a cathode cell having a first electrode; an anode cell having a second electrode; a membrane separating the cathode cell and the anode cell; a first electrolyte tank with a catholyte, the first electrolyte tank in fluid communication with the cathode cell; a second electrolyte tank with an anolyte, the second electrolyte tank in fluid communication with the anode cell; a first rebalancing cell in fluid communication between the cathode cell and the first electrolyte tank, the first rebalancing cell configured to reduce active species from the catholyte; and, a second rebalancing cell in fluid communication with the first electrolyte tank and the second electrolyte tank such that the first electrolyte tank and the second electrolyte tank are in direct fluid communication, the second rebalancing cell configured to reduce active species from the catholyte. An embodiment of the invention is one, any or all of prior embodiments in this paragraph up through the second embodiment in this paragraph, wherein the second rebalancing cell comprises at least two chambers, wherein a first chamber of the at least two chambers is configured to receive a portion of the catholyte and provide a reduced catholyte to the second electrolyte tank and, wherein a second chamber of the at least two chambers is configured to receive a second portion of the catholyte. An embodiment of the invention is one, any or all of prior embodiments in this paragraph up through the second embodiment in this paragraph, wherein an effluent stream from the second chamber comprises $H^+$ ions. An embodiment of the invention is one, any or all of prior embodiments in this paragraph up through the second embodiment in this paragraph, wherein the rebalancing cell comprises a third chamber configured to oxidize hydrogen gas. An embodiment of the invention is one, any or all of prior embodiments in this paragraph up through the second embodiment in this paragraph, wherein the first chamber and the third chamber are in electrical communication, and wherein the second chamber is located between the first chamber and the third chambers. An embodiment of the invention is one, any or all of prior embodiments in this paragraph up through the second embodiment in this paragraph, wherein the reduced catholyte stream comprises $H^+$ ions.

A third embodiment of the invention is a process for balancing a pH, a state of charge, or a supporting electrolyte concentration of an electrolyte for an iron redox flow battery, the iron redox flow battery having a cathode cell with a first electrode and a catholyte and an anode cell with a second electrode and an anolyte, wherein the process comprises passing a portion of the catholyte to a rebalancing cell; reducing a ferrous ions from the catholyte to provide a reduced catholyte; and, combining the reduced catholyte with the anolyte upstream of the anode cell. An embodiment of the invention is one, any or all of prior embodiments in this paragraph up through the third embodiment in this paragraph, further comprising storing the reduced catholyte in a storage vessel before combining the reduced catholyte with the anolyte upstream. An embodiment of the invention is one, any or all of prior embodiments in this paragraph up through the third embodiment in this paragraph, further comprising monitoring a condition of the catholyte, the anolyte, or both by obtaining one or more values relating to the condition of the catholyte, the anolyte, or both; comparing the one or more obtained values against a threshold value; and, when the one or more obtained values is above or below the threshold value, pumping a volume of reduced catholyte from the storage vessel to combine with the anolyte.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An iron redox flow battery system comprising:
   a redox electrode in fluid communication to a first electrolyte tank with a catholyte;
   a plating electrode in fluid communication to a second electrolyte tank with an anolyte;
   a rebalancing cell in fluid communication with the redox electrode and configured to reduce active species from the catholyte;
   a second rebalancing cell in fluid communication with the first electrolyte tank and the second electrolyte tank such that the first electrolyte tank and the second electrolyte tank are in direct fluid communication;
   a monitoring device configured to provide an obtained value relating to a condition of the catholyte, or the anolyte, or both; and,
   a controller in communication with the monitoring device, the controller comprising non-transitory computer-readable media storing executable instructions that, when executed, cause the controller to:
   compare the obtained value against a threshold value; and
   when the obtained value is above or below a threshold, displace a volume of the catholyte from the first electrolyte tank to the second rebalancing cell to reduce ferric cations in the catholyte.

2. The iron redox flow battery system of claim 1, wherein the second rebalancing cell is a hydrogen recombination reactor.

3. The iron redox flow battery system of claim 2, wherein the hydrogen recombination reactor is a chemical reactor, a catalytic reactor, or an electrochemical reactor.

4. The iron redox flow battery system of claim 1, wherein the catholyte and the anolyte both comprise iron ions and wherein a source of the iron ions comprises $FeCl_2$, $FeCl_3$, $FeSO_4$, $Fe_2(SO_4)_3$, FeO, Fe, $Fe_2O_3$, or combinations thereof.

5. The iron redox flow battery system of claim 1, wherein the anolyte comprises $Fe^{2+}$ at a concentration between 1.0 to 4.5 M.

6. The iron redox flow battery system of claim 5, wherein the anolyte further comprises one or more of NaCl, KCl, $NH_4Cl$, boric acid, glycine, $FeCl_3$, or combinations thereof.

7. The iron redox flow battery system of claim 5, wherein the catholyte comprises $Fe^{2+}$ at a concentration between 0.5 to 4.0 M.

8. The iron redox flow battery system of claim 5, wherein the catholyte further comprises one or more of NaCl, KCl, $NH_4Cl$, HCl, glycine, boric acid, $FeCl_3$, or combinations thereof.

9. The iron redox flow battery system of claim 1, wherein the volume of the catholyte is displaced, via a pump.

10. The iron redox flow battery system of claim 9, further comprising:
a storage vessel in fluid communication between the second rebalancing cell and the second electrolyte tank.

11. The iron redox flow battery system of claim 10, wherein the executable instructions, when executed, further cause the controller to:
compare an obtained value against a threshold value; and
when the obtained value is above or below the threshold, pump a volume of fluid, via a pump, from the storage vessel to the second electrolyte tank.

12. An iron redox flow battery system comprising:
a cathode cell having a first electrode;
an anode cell having a second electrode;
a membrane separating the cathode cell and the anode cell;
a first electrolyte tank with a catholyte, the first electrolyte tank in fluid communication with the cathode cell;
a second electrolyte tank with an anolyte, the second electrolyte tank in fluid communication with the anode cell;
a first rebalancing cell in fluid communication between the cathode cell and the first electrolyte tank, the first rebalancing cell configured to reduce active species from the catholyte; and,
a second rebalancing cell in fluid communication with the first electrolyte tank and the second electrolyte tank such that the first electrolyte tank and the second electrolyte tank are in direct fluid communication, the second rebalancing cell configured to reduce active species from the catholyte;
a monitoring device configured to provide an obtained value relating to a condition of the catholyte, or the anolyte, or both; and,
a controller in communication with the monitoring device, the controller comprising non-transitory computer-readable media storing executable instructions that, when executed, cause the controller to:
compare the obtained value against a threshold value; and
when the obtained value is above or below a threshold, displace a volume of the catholyte from the first electrolyte tank to the second rebalancing cell to reduce ferric cations in the catholyte.

13. The iron redox flow battery system of claim 12, wherein the second rebalancing cell comprises at least two chambers, wherein a first chamber of the at least two chambers is configured to receive a portion of the catholyte and provide a reduced catholyte to the second electrolyte tank and, wherein a second chamber of the at least two chambers is configured to receive a second portion of the catholyte.

14. The iron redox flow battery system of claim 13, wherein an effluent stream from the second chamber comprises $H^+$ ions.

15. The iron redox flow battery system of claim 13, wherein the second rebalancing cell comprises a third chamber configured to oxidize hydrogen gas.

16. The iron redox flow battery system of claim 15, wherein the first chamber and the third chamber are in electrical communication, and wherein the second chamber is located between the first chamber and the third chambers.

17. The iron redox flow battery system of claim 13, wherein the reduced catholyte stream comprises $H^+$ ions.

* * * * *